United States Patent [19]

Mitcham

[11] Patent Number: 4,753,380

[45] Date of Patent: Jun. 28, 1988

[54] OVERDRIVEN TRACTOR-FRICTION PAPER DRIVE

[75] Inventor: Larry D. Mitcham, Cypress, Tex.

[73] Assignee: Texas Instruments Incorporated, Dallas, Tex.

[21] Appl. No.: 432,226

[22] Filed: Oct. 1, 1982

[51] Int. Cl.[4] .......................... B41J 11/30; G03B 1/30

[52] U.S. Cl. .......................................... 226/74; 400/616.1

[58] Field of Search ......................... 226/4, 74, 75, 108; 400/616.1, 616.2, 614.1

[56] References Cited

U.S. PATENT DOCUMENTS

| | | | |
|---|---|---|---|
| 2,080,524 | 5/1937 | Allen | 226/74 X |
| 2,130,015 | 9/1938 | Jensen | 226/74 X |
| 4,088,256 | 5/1978 | Potma et al. | 226/74 |
| 4,304,345 | 12/1981 | Carlin | 226/74 |

*Primary Examiner*—Stuart S. Levy

*Assistant Examiner*—Joseph J. Hail, III

*Attorney, Agent, or Firm*—Thomas G. Devine; Thomas W. DeMond; Melvin Sharp

[57] ABSTRACT

A paper web-moving system includes a friction-type drive roll mechanism cooperatively operating with a detachable tractor drive mechanism. In one embodiment, the paper first passes over and engages a pair of driven tractors at an angle with respect to the horizontal, then under a driven roller platen and between two spaced apart sets of rollers positioned to force the paper against the roller platen. The drive mechanisms are configured so that the paper drive rate of the roller platen is greater than the drive rate of the tractor, causing paper tension therebetween. The present system permits the use of friction roll paper, tractor fan fold paper, and single sheets with a short tear-off capability.

5 Claims, 2 Drawing Sheets

OVERDRIVEN TRACTOR-FRICTION PAPER DRIVE

BACKGROUND OF THE INVENTION

This invention relates to web-moving apparatus and in particular to an improved paper feed system for impact and other printers.

It is desirable in a printer paper feed system to have the capability of feeding various types of paper including rolls, tractor fan fold and single sheets. It is also desirable that such systems have a "short tear-off" capability, i.e., the ability to separate individual sheets of fan fold paper with minimum waste. In conventional tractor drive systems, the paper must be passed through the tractor before tear-off can occur, thus wasting a portion of the form material.

Other prior art systems have attempted to solve this problem, for example, by pushing the paper through a fixed platen, by affixing pin wheels directly on the platen, or by driving a roller platen and a tractor at the same speed.

Pushing the paper through a fixed gap in front of a flat platen works well on some forms, but other forms are not rigid enough to push. This configuration also places the paper in a relatively loose condition near the exit opening of the feed system causing the printer to be very noisy. Further, it is usually difficult to load the paper because the tractors are placed very low in the machine, and these systems are either dedicated to friction drive with fixed pins, or to adjustable tractor drives with no single sheet or roll capability.

Affixing pin wheels directly on the platen alleviates the tear-off problem, however, only one width of paper form can be used and the paper is difficult to load. Other prior art systems which drive the roller platen and tractors together have no way of removing slack between them.

SUMMARY OF THE INVENTION

The present invention overcomes the prior art disadvantages by providing a paper feed system including a friction type drive roll mechanism cooperatively operating with a tractor drive mechanism and including means for causing a constant paper tension therebetween. In the case of tractor fan fold paper, the paper first passes over and engages a pair of driven tractors mounted at an angle with respect to the horizontal. The paper then passes under a driven roller platen and between two spaced apart sets of rollers positioned to force the paper against the roller platen. In one embodimemt, the two drive mechanisms are driven by a single drive means and the constant paper tension is provided by selecting the drive ratios so that the paper drive rate of the roller platen is greater than the drive rate of the tractors. In another embodiment each drive mechanism has a separate drive means.

It is an object of the present invention to provide an improved paper feed system for use with a variety of types of paper form.

Another object of this invention is to provide a combined tractor and friction feed drive mechanism with a short tear-off capability.

Yet another object of this invention is to provide a paper feed system having a tractor drive mechanism, a roller drive mechanism, and means for maintaining a constant paper tension therebetween.

BRIEF DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings in which like numerals represent like parts throughout the several views, and wherein:

DETAILED DESCRIPTION OF THE INVENTION

Figure 1:
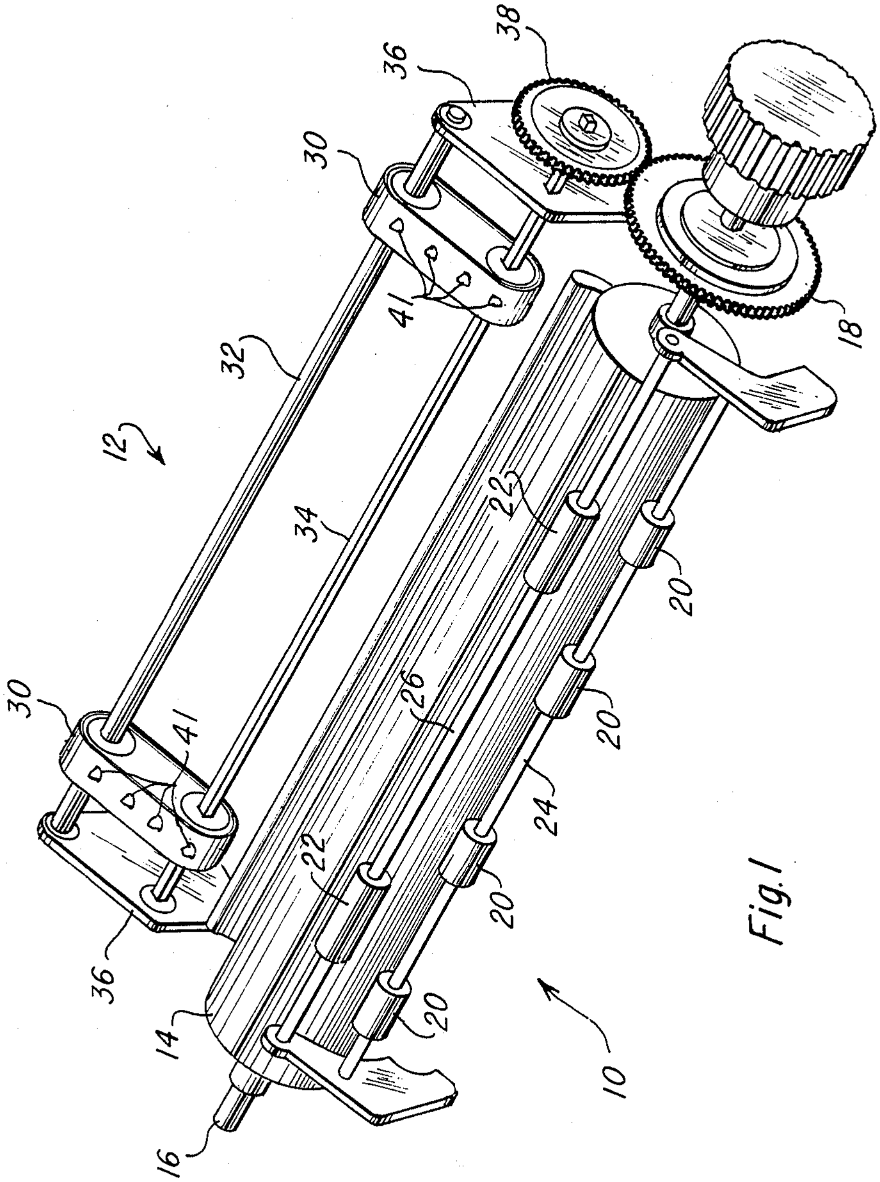
FIG. 1 is a diagramatic view of a paper web-moving system according to the present invention.
Figure 2:
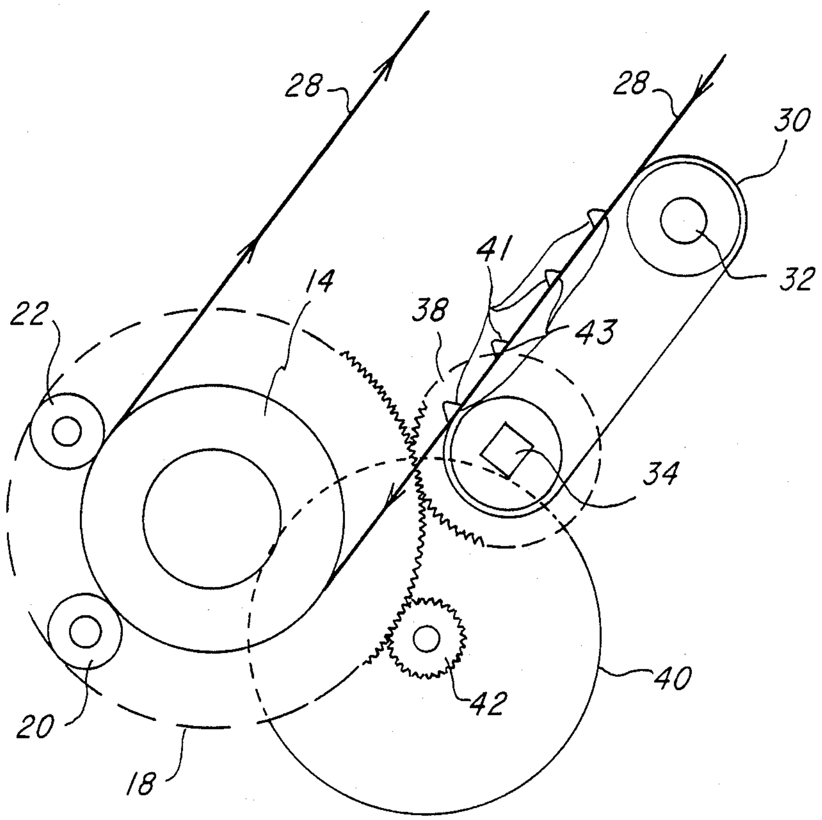
FIG. 2 is an elevational view of a portion of the system of FIG. 1 showing the paper path therethrough.

Referring now to the drawings, there is shown in FIGS. 1 and 2 one embodiment of a paper web-moving system according to the present invention, including a roller platen mechanism 10 and a tractor drive mechanism 12. Roller platen mechanism 10 includes a cylindrical roller 14 having an axle 16 with a platen drive gear 18 affixed to one end thereof. A plurality of lower primary rollers 20 and a plurality of exit rollers 22 are rotatably mounted on axles 24 and 26, respectively, and are positioned to force a paper web 28 against roller 14 as shown in FIG. 2.

Tractor drive mechanism 12 has two tractors 30 rotatably supported on a guide bar 32 and driven by a drive shaft 34 extending therethrough. Guide bar 32 and drive shaft 34 are supported at a fixed angle by tractor brackets 36, the drive shaft 34 extending through one of the brackets 36 and terminating in a tractor drive gear 38. Tractor mechanism 12 is positioned adjacent roller platen mechanism 10 so that gear 38 engages gear 18.

Referring to FIG. 2, gear 18 and gear 38 may advantageously be driven by a single stepper motor 40 having a drive gear 42 which engages gear 18. In the case of fan fold type paper havig spaced apart perforations along each vertical edge, the paper 28 first passes over the tractors 30, tractor teeth 41 engaging perforations 43, under roller platen 14 and then between roller 14 and rollers 20 and 22. The diameter of roller platen 14, the effective diameter of tractors 30, and the relative sizes of gear 18 and gear 38 are selected so that the paper drive rate of roller mechanism 10 is slightly greater than the paper drive rate of tractor mechanism 12. That is, the roller platen 14 is trying to move more paper 28 in a given period of time than the tractor 30, resulting in a constant paper tension between roller platen 14 and tractors 30. This difference in paper drive rates minimizes short term vertical error in a printer, and minimizes print noise by holding paper 28 in tension around roller platen 14. Short tear-off of paper 28 is achieved by the proximity of exit rollers 22 to the printing surface of roller platen 14, as compared to conventional tractor feed systems where the paper is pulled over a platen by the tractors. While any difference in drive rates will create a constant tension between the drive mechanisms, for example, a difference as low as 0.25 percent, it has been found that a difference of at least 0.5 percent is particularly advantageous. A separate drive means (not shown) may be used for each drive mechanism so long as the difference in drive rates is maintained. In such a case gear 18 would be decoupled from gear 38.

Tractor drive mechanism 12 may be made detachable from roller platen mechanism 10 by means well known to those skilled in the art. Thus, when it is desired to use roll stock or single sheets of paper, tractor drive mechanism 12 may be conveniently detached and the present system operated as a conventional friction type roller drive system. In an alternative embodiment, the lower primary rollers 20 may be individually mounted on a plurality of individual axles rather than a common axle 24, and tractor drive mechanism 12 may comprise other known types of tractors 30, for example, pinwheel type tractors.

While the present invention has been described and illustrated with respect to a specific embodiment, it is to be understood that various modifications may be made without departing from the spirit and the scope of the invention.

What is claimed is:

1. A printing device having web-moving apparatus, comprising:

(a) drive means;

(b) drive roll means over which the web passes, rigidly mechanically connected to be rotated by the drive means;

(c) pressure means positioned to force the web against the drive roll means for providing a printing surface against the drive roll means, and to move the web when the drive means is activated, the pressure means also positioned at the exit of the web for permitting the web to be torn off adjacent thereto; and (d) tractor means over which the web first passes positioned adjacent the drive roll means, rigidly mechanically connected to be rotated by the drive means, wherein the web drive rate of the drive roll means is greater than the web drive rate of the tractor drive means causing a constant web tension at the printing surface.

2. The printing device of claim 1 wherein the drive means includes first gear means affixed thereto, the drive roll means includes second gear means affixed thereto rotatably engaging the first gear means to be rotated by the drive means, and the tractor drive means includes third gear means rotatably connected to be rotated by the second gear means.

3. The printing device of claim 2 wherein said tractor drive means comprises:

a pair of spaced apart tractors each comprising a continuous belt rotatably mounted on belt support means and having a plurality of spaced apart projections thereon corresponding to spaced apart perforations in said web;

guide bar means extending through and rotatably engaging said belt support means; and drive shaft means spaced apart from said guide bar means and extending through said belt support means, said drive shaft means having said third gear means affixed to one end thereof, wherein said guide bar means and said drive shaft means rotatably support said tractors at an angle with respect to the horizontal.

4. The printing device of claims 2 or 3 wherein said pressure means comprises:

a plurality of first spaced apart rollers rotatably mounted and positioned to force the web against said drive roll means; and a plurality of second spaced apart rollers rotatably mounted and positioned upstream of said plurality of first rollers with respect to the direction of web movement to force the web against said drive roll means forming the printing surface therebetween.

5. The printing device of claim 4 wherein said drive roll means comprises a cylinder having an axle to which said second gear means is affixed.

* * * * *